(12) United States Patent
Nakatani et al.

(10) Patent No.: US 7,604,878 B2
(45) Date of Patent: Oct. 20, 2009

(54) MAGNETO-OPTICAL RECORDING MEDIUM AND LAYER STRUCTURE

(75) Inventors: Morio Nakatani, Shijonawate (JP); Satoshi Sumi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 533 days.

(21) Appl. No.: 11/204,106

(22) Filed: Aug. 16, 2005

(65) Prior Publication Data

US 2006/0053433 A1 Mar. 9, 2006

(30) Foreign Application Priority Data

Sep. 6, 2004 (JP) ............................ 2004-259074
Mar. 1, 2005 (JP) ............................ 2005-055383

(51) Int. Cl.
*G11B 11/105* (2006.01)
(52) U.S. Cl. ..................................... 428/825
(58) Field of Classification Search .................. None
See application file for complete search history.

(56) References Cited

U.S. PATENT DOCUMENTS

| | | | | |
|---|---|---|---|---|
| 5,110,707 A * | 5/1992 | Fujita et al. | ................ | 430/256 |
| 6,212,137 B1 | 4/2001 | Nakajima | | |
| 6,687,197 B1 * | 2/2004 | Matsumoto | ............... | 369/13.38 |
| 7,088,670 B2 * | 8/2006 | Kondo | ..................... | 369/275.4 |
| 7,391,709 B2 * | 6/2008 | Kondo | ..................... | 369/275.4 |
| 2004/0141425 A1 * | 7/2004 | Fujita et al. | .............. | 369/13.06 |
| 2006/0083154 A1 * | 4/2006 | Nakatani et al. | ......... | 369/275.1 |

FOREIGN PATENT DOCUMENTS

| | | |
|---|---|---|
| JP | 61-140443 U | 8/1986 |
| JP | 04-372748 | 12/1992 |
| JP | 05-290415 | 11/1993 |
| JP | 06-162585 | 6/1994 |
| JP | 06-302029 | 10/1994 |
| JP | 11-353725 A | 12/1999 |
| JP | 2003-109247 A | 11/2003 |
| JP | 2004-030717 A | 1/2004 |
| JP | 2004-259387 | 9/2004 |
| WO | WO 2004-068485 A1 * | 8/2004 |
| WO | WO 2005/062301 A1 | 7/2005 |

OTHER PUBLICATIONS

Derwent Abstract Translation of WO 02089129 A1 (Derwent Acc-No: 2003-058870).*
Derwent Abstract Translation of WO 2004/068485 A1 (Derwent-Acc-No: 2004-594477).*
Japanese Notification of Reasons for Refusal, w/ English translation thereof, issued in Japanese Patent Application No. JP 2005-055383 dated Jan. 6, 2009.
Japanese Notification of Reasons for Refusal, w/ English translation thereof, issued in Japanese Patent Application No. JP 2005-055383 dated Mar. 17, 2009.

* cited by examiner

*Primary Examiner*—Kevin M. Bernatz
(74) *Attorney, Agent, or Firm*—McDermott Will & Emery LLP

(57) ABSTRACT

A layered magneto-optical recording medium including a substrate and a magnetic layer. The magnetic layer includes columnar projections, which are formed on a film surface of the magnetic layer as arranged in a lengthwise direction and a crosswise direction with a pitch smaller than a wavelength of the laser light.

5 Claims, 15 Drawing Sheets

EQUIPMENT :JSM 6700F NT
ACCELERATION VOLTAGE(kV) :3.0
MAGNIFICATION : x80000
IMAGE : SEI
<SECONDARY ELECTRON IMAGE>

Pt-Pd EVAPORATION (10 Å )
T=0

EQUIPMENT :JSM 6700F NT
ACCELERATION VOLTAGE(kV) :9.0
MAGNIFICATION : x80000
IMAGE : SEI
<SECONDARY ELECTRON IMAGE>

Pt-Pd EVAPORATION (10 Å )
T=50

0-020-No36 T=0 x100000

EQUIPMENT :JSM 6700F NT
--------------------------------
ACCELERATION VOLTAGE(kV) :3.0
MAGNIFICATION : x100000
IMAGE : SEI
<SECONDARY ELECTRON IMAGE>
--------------------------------

--------------------------------
Pt-Pd EVAPORATION (20 Å)
T=0

0-020-No36 T=0 x100000

EQUIPMENT :JSM 6700F NT
--------------------------------
ACCELERATION VOLTAGE(kV) :3.0
MAGNIFICATION : x100000
IMAGE : SEI
<SECONDARY ELECTRON IMAGE>
--------------------------------

--------------------------------
Pt-Pd EVAPORATION (20 Å)
T=0

0-020-No36 T=50 x50000

EQUIPMENT :JSM 6700F NT
---------------------------------
ACCELERATION VOLTAGE(kV) :14.0
MAGNIFICATION : x50000
IMAGE : SEI
<SECONDARY ELECTRON IMAGE>
---------------------------------

---------------------------------
Pt-Pd EVAPORATION (20 Å )
T=50

0-020-No36 T=50 x100000

EQUIPMENT :JSM 6700F NT
---------------------------------
ACCELERATION VOLTAGE(kV) :14.0
MAGNIFICATION : x100000
IMAGE : SEI
<SECONDARY ELECTRON IMAGE>
---------------------------------

---------------------------------
Pt-Pd EVAPORATION (20 Å )
T=50

PARTIAL ENLARGED VIEW

LIGHT MICROSCOPIC PHOTOGRAPH

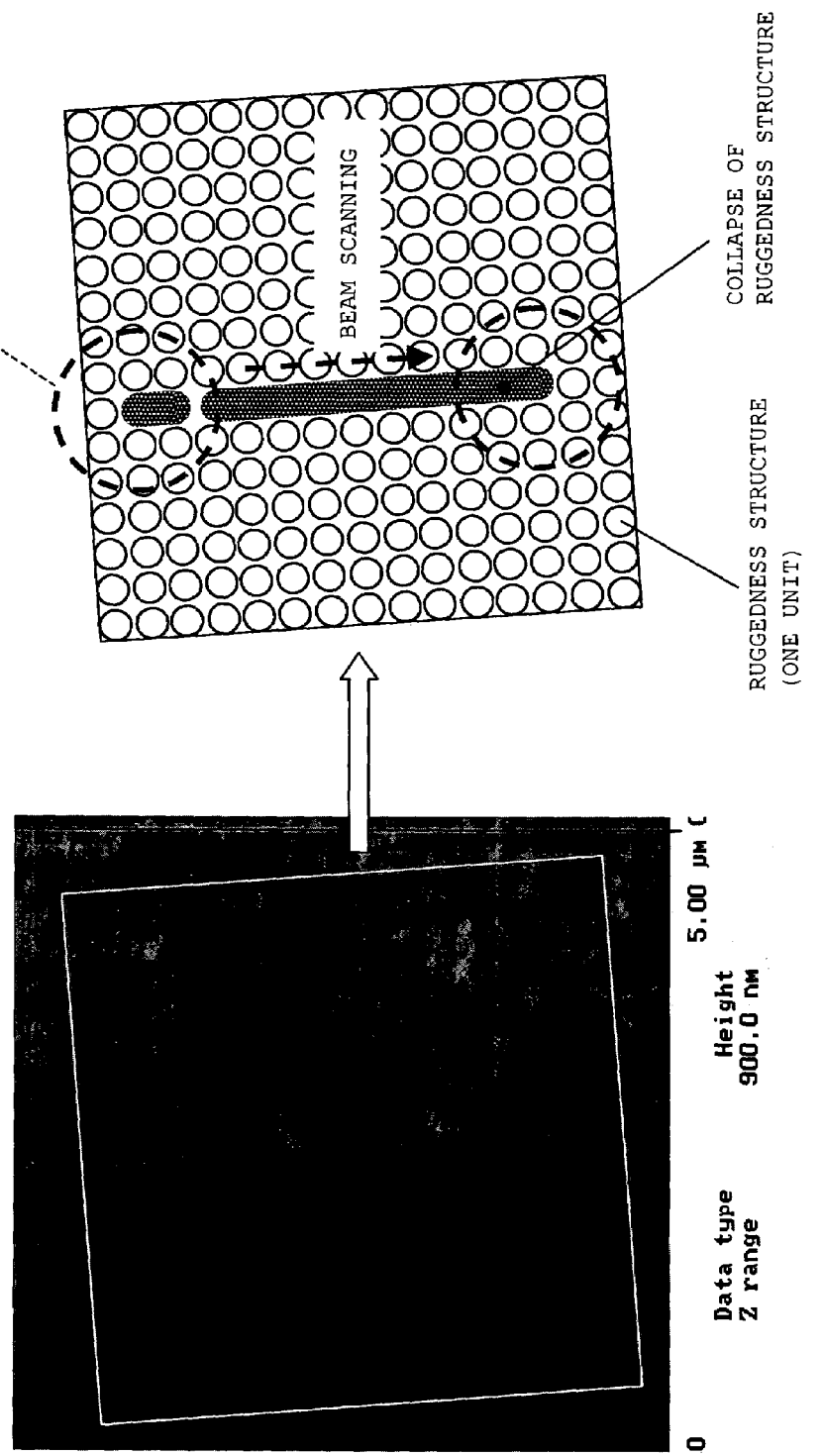

FIG.12

| APPLICATION MAGNETIC FIELD (Oe) | RUGGEDNESS STRUCTURE | FLAT SURFACE |
|---|---|---|
| 1000 | ○ | ○ |
| 500 | ○ | × |
| 400 | ○ | × |
| 300 | ○ | × |
| 200 | × | × |
| 100 | × | × |

○ : possible to form recording marks
× : impossible to form recording marks

RECORDING EXPERIMENT OF MARK OF 4T

MAGNETO-OPTICAL RECORDING MEDIUM AND LAYER STRUCTURE

BACKGROUND OF THE INVENTION

1. Field of the Invention

The present invention relates to a magneto-optical recording medium and a layer structure and is in particular useful as a technique of achieving an increase of a Kerr rotation angle and improvements of a recording sensitivity and a recording density.

2. Description of the Related Art

Conventionally, as magneto-optical recoding media, magnetic optical (MO) discs and mini discs (MDs) have been developed and commercialized. In the case of such a magneto-optical recording medium, a Kerr rotation angle at the time of irradiation with reproduction light influences the SNR (Signal to Noise Ratio) of a reproduction signal, so various techniques of increasing the Kerr rotation angle have been studied heretofore.

For instance, in a prior art (Prior Art 1) described in JP 2004-30717 A, by improving the composition and layer construction of a recording layer, lowering of the Kerr rotation angle with respect to blue laser light is suppressed. That is, the composition of an RE-TM alloy constituting the recording layer is set TM-rich, an antiferromagnetic layer is formed on the recording layer, and a flattening layer having superior surface smoothness is formed as a primary coating of the antiferromagnetic layer as a countermeasure against surface roughness due to the formation of the antiferromagnetic layer. Aside from this, a method is also considered with which by repeatedly reflecting laser light with a dielectric layer (multiple reflection), the Kerr rotation angle is increased.

Also, various techniques of improving the recording sensitivities of the magneto-optical recording media are studied. For instance, in a prior art (Prior Art 2) described in JP 11-353725 A, a recording auxiliary layer and a ferromagnetic layer are arranged in addition to a recording layer. According to this prior art, a magnetic field at the position of the recording layer is increased through generation of a magnetic field by the recording auxiliary layer from an external magnetic field and concentration of a magnetic flux by the action of the ferromagnetic layer, thereby an improvement of a recording sensitivity is achieved.

Further, various techniques of improving the recording densities of the magneto-optical recording media are studied. For instance, in a prior art (Prior Art 3) described in JP 2003-109247 A, by forming minute recording cells while separating them from each other with non-recording areas, an improvement of a recording density is achieved.

According to Prior Art 1 described above, however, it is required to set the composition of the recording layer TM-rich and additionally arrange the antiferromagnetic layer and the flattening layer, so a limitation is imposed on the flexibility of a medium construction and there is a possibility that a demerit in terms of cost will occur. In addition, when the method is used with which the dielectric layer is additionally arranged, the number of manufacturing steps is increased accordingly, so there occurs a problem in that a cost is increased and a limitation is imposed on the flexibility of a medium construction like in the case of Prior Art 1.

Also, according to Prior Art 2 described above, it is required to additionally arrange the recording auxiliary layer and the ferromagnetic layer in order to improve the recording sensitivity, so there occurs a problem in that manufacturing steps become complicated.

Further, according to Prior Art 3 described above, it is required to form the recording cells while separating them from each other with the non-recording areas in order to improve the recording density, so there occurs a problem in that complication of manufacturing steps and an increase in cost are inevitable.

SUMMARY OF THE INVENTION

It is therefore an object of the present invention to provide a magneto-optical recording medium and a layer structure with which it becomes possible to effectively achieve an increase of a Kerr rotation angle and improvements of a recording sensitivity and a recording density without limiting the flexibility of a medium construction by using a simple construction.

To achieve the object, according to a first aspect of the present invention, there is provided A magneto-optical recording medium to which recording and reproduction are performed using laser light and an external magnetic field, comprising: a magnetic layer having a ruggedness structure with a pitch smaller than a wavelength of the laser light on its own film surface.

In further aspect of the magneto-optical recording medium, the ruggedness structure may be formed on a film surface of the magnetic layer that gives a Kerr rotation action to a polarization plane of the laser light. In this case, the ruggedness structure may be formed through reflecting a shape of a ruggedness structure formed on a surface of substrate in the film surface of the magnetic layer. For instance, the ruggedness structure on the substrate is reflected in the film surface of the magnetic layer through directly forming the magnetic layer on a surface of the substrate having the ruggedness structure.

According to a second aspect of the present invention, there is provided a layer structure of a magnetic layer that gives a Kerr rotation action to a polarization plane of laser light, having a ruggedness structure formed on a film surface of the magnetic layer with a pitch smaller than a wavelength of the laser light.

According to a third aspect of the present invention, there is provided a layer structure of a magnetic layer whose magnetization direction is fixed through temperature rise by irradiation with laser light and through application of an external magnetic field, having a ruggedness structure formed on a film surface of the magnetic layer with a pitch smaller than a wavelength of the laser light.

According to the present invention, by adopting a novel construction in which a minute ruggedness structure is formed for a film surface of a magnetic layer, it becomes possible to effectively increase a Kerr rotation angle and dramatically improve a recording sensitivity and a recording density at the same time. Also, according to the present invention, changing of the composition of a recording layer, arrangement of special layers, and the like are not required, so no limitation is imposed on the flexibility of a medium construction. As a result, it becomes possible to widely apply the present invention to magneto-optical recording media having various layer constructions.

In particular, when a ruggedness structure is formed on a substrate surface and is reflected in a film surface of a magnetic layer as described above, a process for forming the ruggedness structure for the film surface of the magnetic layer at the time of film formation becomes unnecessary. As a result, it becomes possible to suppress complication of recording medium manufacturing processes. Note that as will be described in the following embodiments, it is possible to form the ruggedness structure on the substrate surface with ease, smoothly, and at low cost using an already-existing ejection molding technique or the like.

BRIEF DESCRIPTION OF THE DRAWINGS

The above and other objects and novel features of the present invention will become apparent more completely from the following description of embodiments to be made with reference to the accompanying drawings, wherein:

FIG. 11A shows a result of measurement of a recording mark formation state in a second measurement example (measurement of recoding density);

FIG. 11B schematically shows the result of measurement in the second measurement example (measurement of recording density);

FIG. 12 shows a result of measurement of an application magnetic field sensitivity in a first measurement example (measurement of recording sensitivity);

DETAILED DESCRIPTION OF THE PREFERRED EMBODIMENTS

Hereinafter, embodiments of the present invention will be described with reference to the accompanying drawings. It should be noted here that there is no intention to limit the present invention to the following embodiments.

Figure 1:
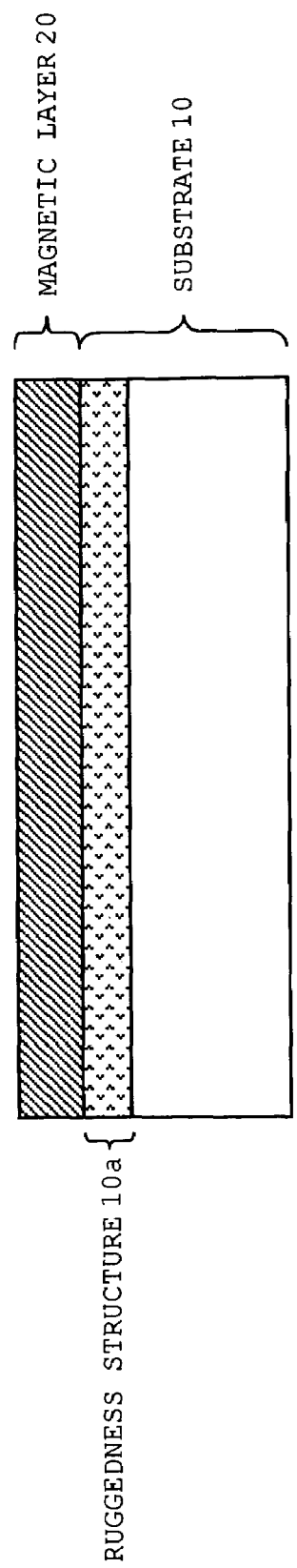
FIG. 1 shows a basic construction of a magneto-optical recording medium according to an embodiment mode of the present invention.

First, a basic construction of a magneto-optical recording medium will be described with reference to FIG. 1.

As shown in the drawing, the magneto-optical recording medium has a construction in which a magnetic layer 20 is formed on a substrate 10. Here, the substrate 10 is generally made of a translucent material such as polycarbonate. The magnetic layer 20 is made of a magnetic material. Through formation of a film of the magnetic material on the substrate 10 by sputtering or the like, the magnetic layer 20 is generated.

On a surface of the substrate 10 on which the magnetic layer is formed, a minute ruggedness structure 10a is formed. Therefore, when the magnetic layer 20 is formed on the ruggedness structure 10a as described above, the ruggedness structure 10a of the substrate 10 is reflected in a film surface of the magnetic layer 20.

It should be noted here that the ruggedness structure 10a is set at a size such that when the ruggedness structure is reflected in the film surface of the magnetic layer 20, laser light is reflected repeatedly (hereinafter referred to as "multiple reflection") by the ruggedness structure reflected in the magnetic layer. When multiple reflection occurs to laser light, each time reflection is repeated at the magnetic layer 20, a Kerr rotation action is superimposed. As a result, an increasing effect on a Kerr rotation angle with respect to laser light is expected. For this reason, it is preferable that the ruggedness structure 10a be set at a size such that multiple reflection will occur to laser light with the ruggedness structure reflected in the magnetic layer 20.

For instance, when the size of the ruggedness structure 10a is set so that a beam spot of laser light lies across multiple projections of the ruggedness structure 10a at the same time, it becomes possible to cause multiple reflection to the laser light with the ruggedness structure 10a. In this case, when at least the inplane-direction pitch of the ruggedness structure 10a is set smaller than the wavelength of the laser light, the situation is obtained in which the beam spot of the laser light lies across multiple projections at the same time. That is, with a structure in which the inplane-direction pitch of the ruggedness structure 10a is smaller than the wavelength of the laser light, it becomes possible to cause multiple reflection by the ruggedness structure 10a to the laser light.

In addition, when such a minute ruggedness structure 10a is formed, it becomes possible to achieve an improvement of a recording sensitivity and an improvement of a recording density at the same time.

When the ruggedness structure is reflected in the surface of the magnetic layer 20 (recording layer), a light-reception surface area at the time of laser light irradiation is significantly increased as compared with a case where the surface is flat. As a result, heat absorptance with respect to laser light is improved and the temperature of the magnetic layer 20 is increased with efficiency. Also, when the ruggedness structure is reflected in the surface of the magnetic layer 20 (recording layer), an application magnetic field from the outside is concentrated in the tip end portions of the ruggedness structure. Consequently, a situation is obtained in which a large magnetic field is applied to the tip end portions as compared with a case where the surface is flat, and therefore a magnetic field application efficiency in the portions is enhanced. When the ruggedness structure is reflected in the surface of the magnetic layer 20 (recording layer) in the manner described above, the heat efficiency of the recording layer and the magnetic field application efficiency are enhanced at the same time. Therefore, the sensitivity of the recording layer is improved with respect to both of the laser light and the magnetic field and, as a result, it becomes possible to perform recording smoothly even with low laser power and a low magnetic field strength.

Also, when the ruggedness structure is reflected in the surface of the magnetic layer 20 (recording layer), as described above, the magnetic field is concentrated in the tip end portions of the ruggedness structure, so magnetization in the minute areas of the tip ends of the ruggedness structure becomes possible. When doing so, heat generated to the recording layer through irradiation with the laser light hardly escapes in the in-plane direction of the recording layer because the side walls of the ruggedness structure act as barriers against heat transmission. Consequently, a situation is obtained in which a smaller area (center area of the laser spot) is locally increased in temperature as compared with a case where the recording layer is flat. Through such a temperature rise area limitation, a situation is obtained in which only more limited ruggedness structure tip end portions are magnetized. As a result, the size of a recording mark is reduced and the recording density is improved.

(1) Verification as to Kerr Rotation Angle

Magneto-optical recording media each having the construction described above were actually created and Kerr rotation angle measurement was conducted. Hereinafter, results of the measurement will be described.

First Measurement Example

Figure 2A:
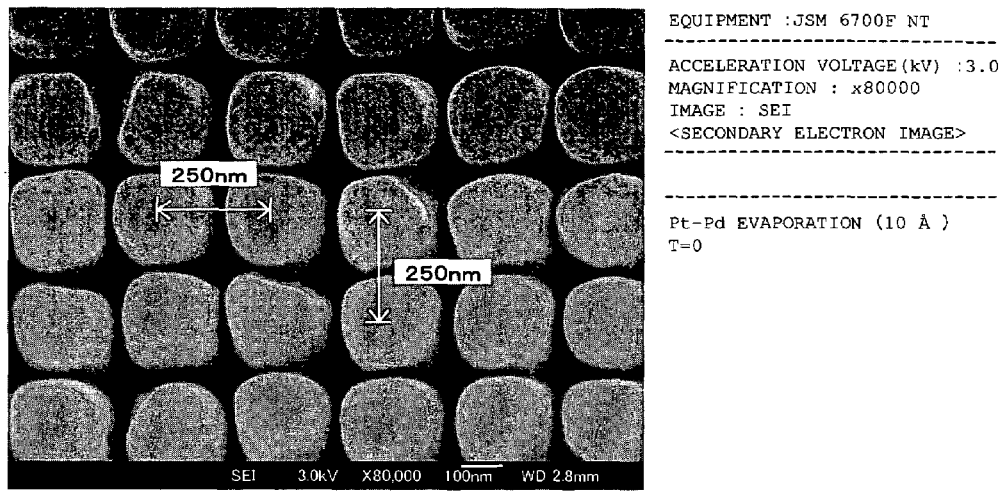
FIG. 2A shows a picked-up electron photograph of a ruggedness structure in a first measurement example (Kerr rotation angle)
Figure 2B:
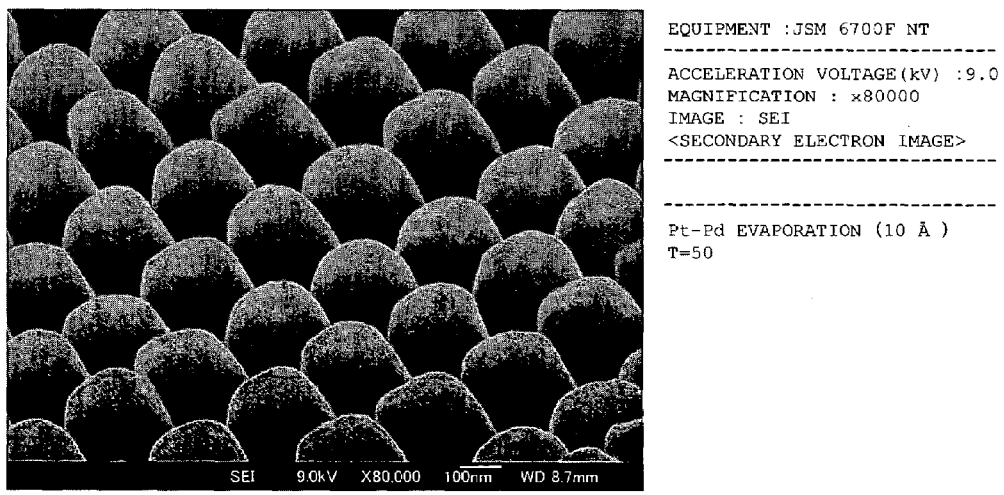
FIG. 2B shows another picked-up electron photograph of the ruggedness structure in the first measurement example (Kerr rotation angle)

FIGS. 2A and 2B each show a secondary electron photographic image of the ruggedness structure 10a formed on the substrate 10. FIG. 2A shows a photographic image picked-up from a top surface side and FIG. 2B shows a photographic image picked-up from a side slanted with respect to a top surface. Note that the photographic images in FIGS. 2A and 2B are images obtained by forming a 20-nm-thick alloy film (magnetic layer) of 50 at. % Co and 50 at. % Al on the ruggedness structure 10a through sputtering and performing image pickup under a state where a 10 Å-thick Pt-Pd film was evaporated for electron photographic image pickup.

As shown in FIGS. 2A and 2B, in this measurement, the ruggedness structure 10a was formed so that cylindrical projections were arranged evenly with a constant pitch in the vertical and horizontal directions. Also, the pitch of the ruggedness structure 10a (distance between adjacent cylindrical projections) was set at 250 nm in both of the vertical direction and the horizontal direction and the height of each of the cylindrical projections was set at 170 nm.

It should be noted here that the substrate 10 shown in FIGS. 2A and 2B was formed in the following manner.

First, a resist was applied to a silicon master disc through spin coating. The resist used in this case is an electron-beam resist and it is possible to use NEB22 manufactured by Sumitomo Chemical Company, Limited, for instance. Following this, the ruggedness structure with the pitch described above was formed through EB lithography (electron beam cutting). After the lithography, development processing was performed and RIE machining was conducted. In addition, by performing oxygen plasma ashing, the remaining resist was removed. As a result, the ruggedness structure was formed on the silicon master disc (Si anlage).

Next, Ni was deposited on the Si anlage through Ni sputtering and electrolytic plating. Then, a stamper was produced by peeling a deposited Ni layer from the Si master disc. Following this, the substrate 10 was produced through injection molding using the stamper. As a result, the substrate 10 having the ruggedness structure was formed.

It should be noted here that it is possible to use as an injection molding machine M-35B-D-DM manufactured by Meiki Co., Ltd., for instance. Also, it is possible to use a translucent material such as polycarbonate or polyolefin as a substrate material. In this measurement, polycarbonate was used. Aside from this, it is possible to use a biodegradable material as the substrate material. In this case, it becomes possible to reduce an environmental load at the time of disposal and the like.

It should be noted here that it is also possible to use laser beam cutting instead of the EB lithography. In this case, a photoresist layer is applied onto the silicon master disc. Also, laser light having a wavelength of around 400 nm was used as a cutting beam.

On the substrate 10 generated in the manner described above, a 20-nm-thick alloy film of 50 at. % Co and 50 at. % Al was formed through sputtering. Note that for the magneto-optical recording medium used in the measurement, only a magnetic film (magnetic layer 20) was formed on the substrate 10. Here, the formation of the magnetic film was performed in the following manner.

After evacuation to $5 \times 10^{-5}$ Pa or more was performed using a vacuum chamber, Ar gas was introduced and sputtering was performed in an atmosphere of 0.6 Pa. A Co target and an Al target were installed in the chamber and an alloy film (magnetic film) of 50 at. % Co and 50 at. % Al was formed using a Co-sputtering method with which alloying was performed by applying electric power to the targets at the same time. Note that in order to uniformly form the magnetic film, the substrate 10 was self-revolved at 40 rpm during discharging.

Figure 3:
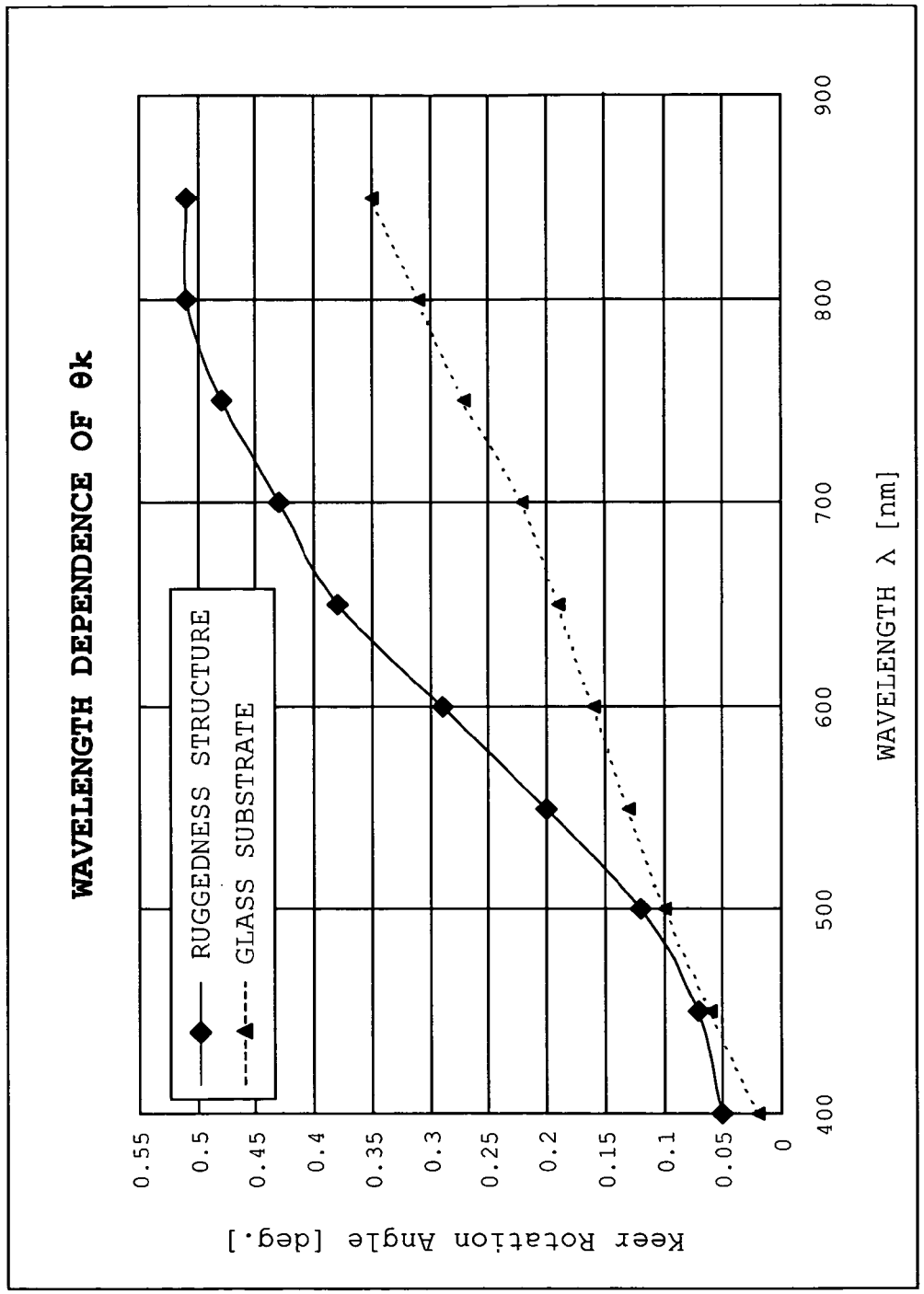
FIG. 3 shows a result of Kerr rotation angle measurement in the first measurement example (Kerr rotation angle)

As to the magneto-optical recording medium generated in the manner described above, Kerr rotation angle measurement was conducted using a Kerr rotation angle measuring instrument. A result of the measurement is shown in FIG. 3. In FIG. 3, a result of Kerr rotation angle measurement conducted as to a magneto-optical recording medium produced by forming a 20-nm-thick alloy film of 50 at. % Co and 50 at. % Al on a glass substrate having a flat magnetic layer formation surface through sputtering is also shown as a comparison example.

It should be noted here that the measurement was conducted by applying a magnetic field through irradiation to the magneto-optical recording medium with parallel light with a long diameter of around 1 cm and a short diameter of around 1 mm from the Kerr rotation angle measuring instrument while changing the wavelength $\lambda$ and by measuring the Kerr rotation angle $\theta k$ of reflection light at that time using the Kerr rotation angle measuring instrument. Note that the parallel light was applied from a magnetic film side.

It can be seen from FIG. 3 that in a wavelength range of 400 to 850 nm, with the substrate 10 having the ruggedness structure 10a, the Kerr rotation angle $\theta k$ is uniformly increased as compared with a case of the glass substrate. It also can be seen that at wavelength bands (650 nm and 780 nm) of red laser light and infrared laser light used for recording and reproduction of MDs and MO discs, the increasing effect on the Kerr rotation angle θk becomes particularly conspicuous. As a result, forming the ruggedness structure 10a on the substrate 10 is expected to achieve an improvement of reproduction signal characteristics of MDs and MO discs.

Second Measurement Example

Figure 4A:
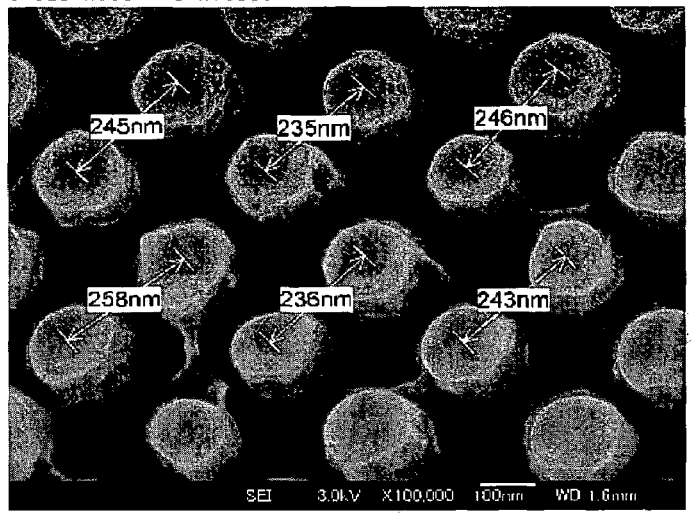
FIG. 4A shows a picked-up electron photograph of a ruggedness structure in a second measurement example (Kerr rotation angle)
Figure 4B:
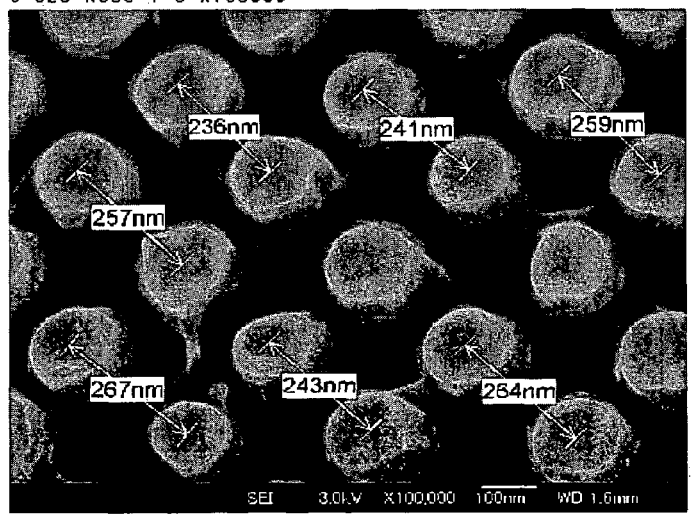
FIG. 4B shows another picked-up electron photograph of the ruggedness structure in the second measurement example (Kerr rotation angle)
Figure 5A:
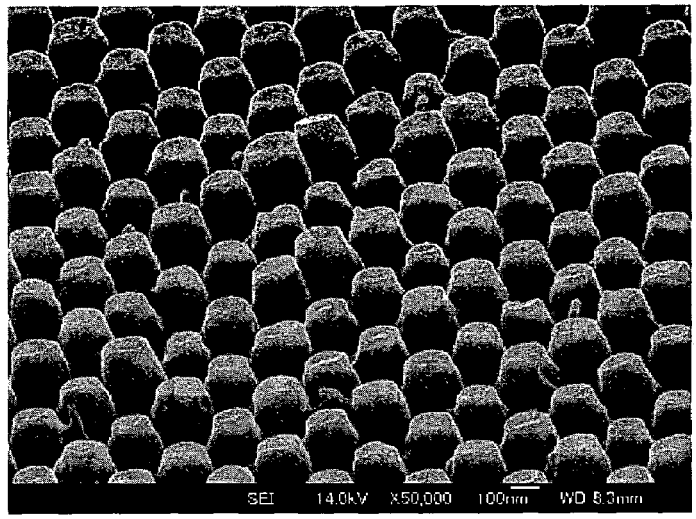
FIG. 5A shows still another picked-up electron photograph of the ruggedness structure in the second measurement example (measurement of Kerr rotation angle)
Figure 5B:
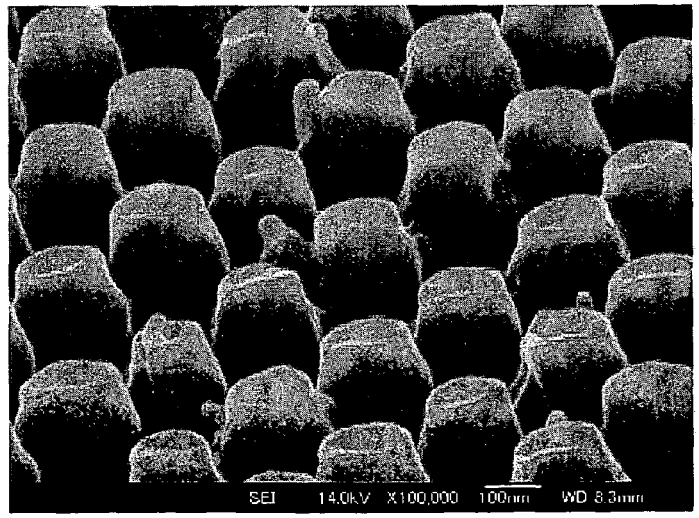
FIG. 5B shows another picked-up electron photograph of the ruggedness structure in the second measurement example (measurement of Kerr rotation angle)

FIGS. 4A and 4B and FIGS. 5A and 5B each show a secondary electron photographic image of the ruggedness structure 10a formed on the substrate 10. FIGS. 4A and 4B each show a photographic image picked-up from a top surface side and FIGS. 5A and 5B each show a photographic image picked-up from a side slanted with respect to a top surface. The magnification of the photographic image in FIG. 5A and that in 5B are different from each other. Note that the photographic images are images picked-up under a state where a 20 Å-thick Pt-Pd film was evaporated onto the ruggedness structure 10a for electron photographic image pickup.

As shown in the drawings, in this measurement, the ruggedness structure 10a was formed so that cylindrical projections were arranged almost evenly in the vertical and horizontal directions. As shown in FIGS. 4A and 4B, the pitch (distance between adjacent cylindrical projections) of the ruggedness structure 10a was set at around 250 nm and the height of each of the cylindrical projections was set at 270 nm.

It should be noted here that as can be seen from comparison of FIGS. 4A and 4B with FIG. 2A, the density of the cylindrical projections in this measurement example was decreased from that in the first measurement example. Also, as can be seen from comparison of FIGS. 5A and 5B with FIG. 2B, in this measurement example, the top end portions of the cylindrical projections were set flat or were depressed to some extent. In this respect, this measurement example differs from the first measurement example described above. Note that the height of each of the cylindrical projections in this measurement example was increased from 170 nm in the first measurement example described above and was set at 270 nm.

A 20-nm-thick alloy film of 50 at. % Co and 50 at. % Al was formed on the substrate 10 through sputtering. Note that for the magneto-optical recording medium used in this measurement, only a magnetic film (magnetic layer 20) was formed on the substrate 10. A method of forming the magnetic film is the same as that in the first measurement example described above. Also, it is possible to perform generation of the substrate with the method described in the first measurement example.

Figure 6:
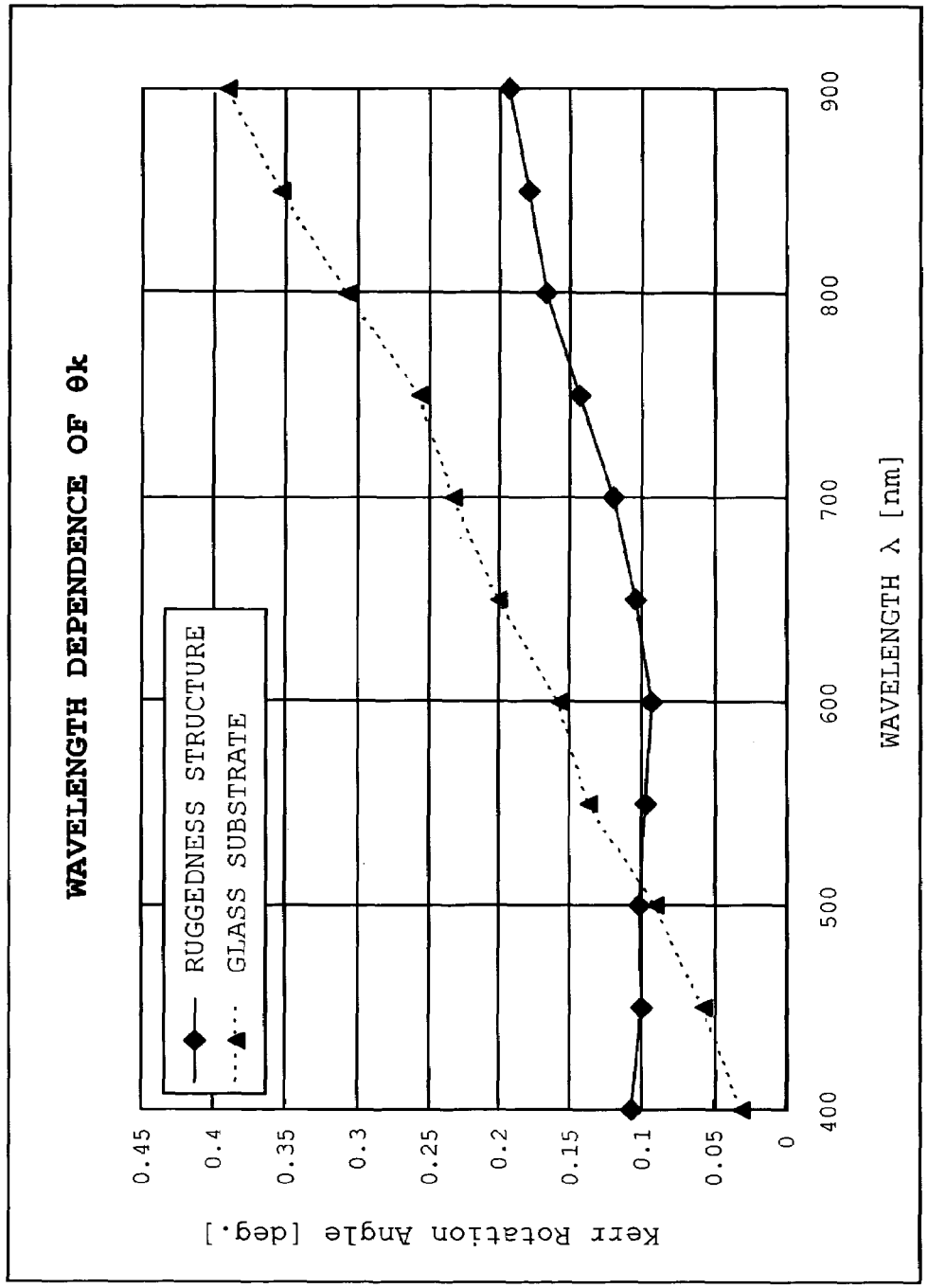
FIG. 6 shows a result of Kerr rotation angle measurement in the second measurement example (measurement of Kerr rotation angle)

As to the magneto-optical recording medium generated in the manner described above, Kerr rotation angle measurement was conducted using a Kerr rotation angle measuring instrument in the same manner as that described above. A result of the measurement is shown in FIG. 6. In FIG. 6, a result of Kerr rotation angle measurement conducted as to a magneto-optical recording medium produced by forming a 20-nm-thick alloy film of 50 at. % Co and 50 at. % Al on a flat glass substrate is also shown as a comparison example.

It can be seen from FIG. 6 that in a wavelength range of 400 to 500 nm, with the substrate 10 having the ruggedness structure 10a, the Kerr rotation angle θk is increased as compared with a case of the glass substrate. In a wavelength range of 500 to 900 nm, however, the Kerr rotation angle θk in the case of the glass substrate is inversely larger than that in the case of the substrate 10 having the ruggedness structure 10a. It also can be seen that in a wavelength range in the vicinity of 400 nm, the Kerr rotation angle θk in the case of the substrate 10 having the ruggedness structure 10a becomes larger than that in the first measurement example (in the case of the substrate 10 having the ruggedness structure 10a).

As a result, it is possible to expect that when the ruggedness structure 10a shown in each of FIGS. 4A and 4B and FIGS. 5A and 5B is formed for the substrate 10, it becomes possible to achieve an increasing effect on the Kerr rotation angle in the case where laser light at a short-wavelength band is used as reproduction laser light and it becomes possible to achieve an improvement of a reproduction signal characteristic, for instance, in the case of application to an MD or an MO disc of next-generation type using violet laser light.

Third Measurement Example

Figure 7:
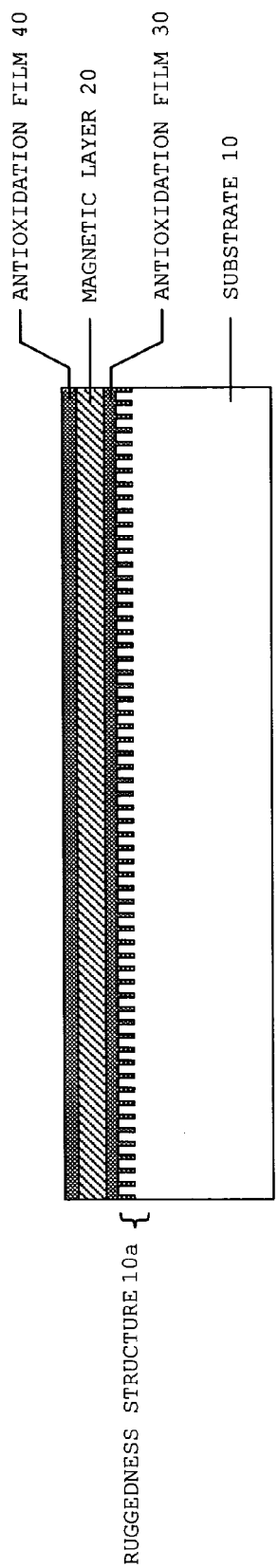
FIG. 7 shows a construction of a magneto-optical recording medium in a third measurement example (measurement of Kerr rotation angle)

In this measurement example, a recording layer (vertical magnetization film) that is capable of holding an external magnetic field in a direction vertical to the film surface was formed and Kerr rotation angle measurement was conducted using Kerr rotation angle measuring equipment by actually performing writing thereto. In this measurement example, as shown in FIG. 7, a 5-nm-thick Sin film (antioxidation film 30) was formed on the substrate 10, which was shown in each of FIGS. 2A and 2B and used in the first measurement example, through sputtering and a 20-nm-thick alloy film (magnetic layer 20) of 17 at. % Tb, 65 at. % Fe, and 18 at. % Co was formed thereon through sputtering. In addition, a 5-nm-thick Sin film (antioxidation film 40) was formed thereon through sputtering. The formation of the alloy film was performed in the same manner as in each of the first and second measurement examples described above. That is, a Tb target, an Fe target, and a Co target were installed in a vacuum chamber and the alloy film was formed through control of making electric power. In order to uniformly form the alloy film, the substrate was self-revolved at 40 rpm during discharging.

As a comparison example, the same measurement was conducted using a magneto-optical recording medium including: a glass substrate having a flat magnetic layer formation surface; a 5-nm-thick SiN film (antioxidation film) formed on the flat magnetic layer formation surface; a 20-nm-thick alloy film (magnetic layer) of 17 at. % Tb, 65 at. % Fe, and 18 at. % Co formed on the Sin film; and a 5-nm-thick SiN film (antioxidation film) formed on the alloy film.

Figure 8:
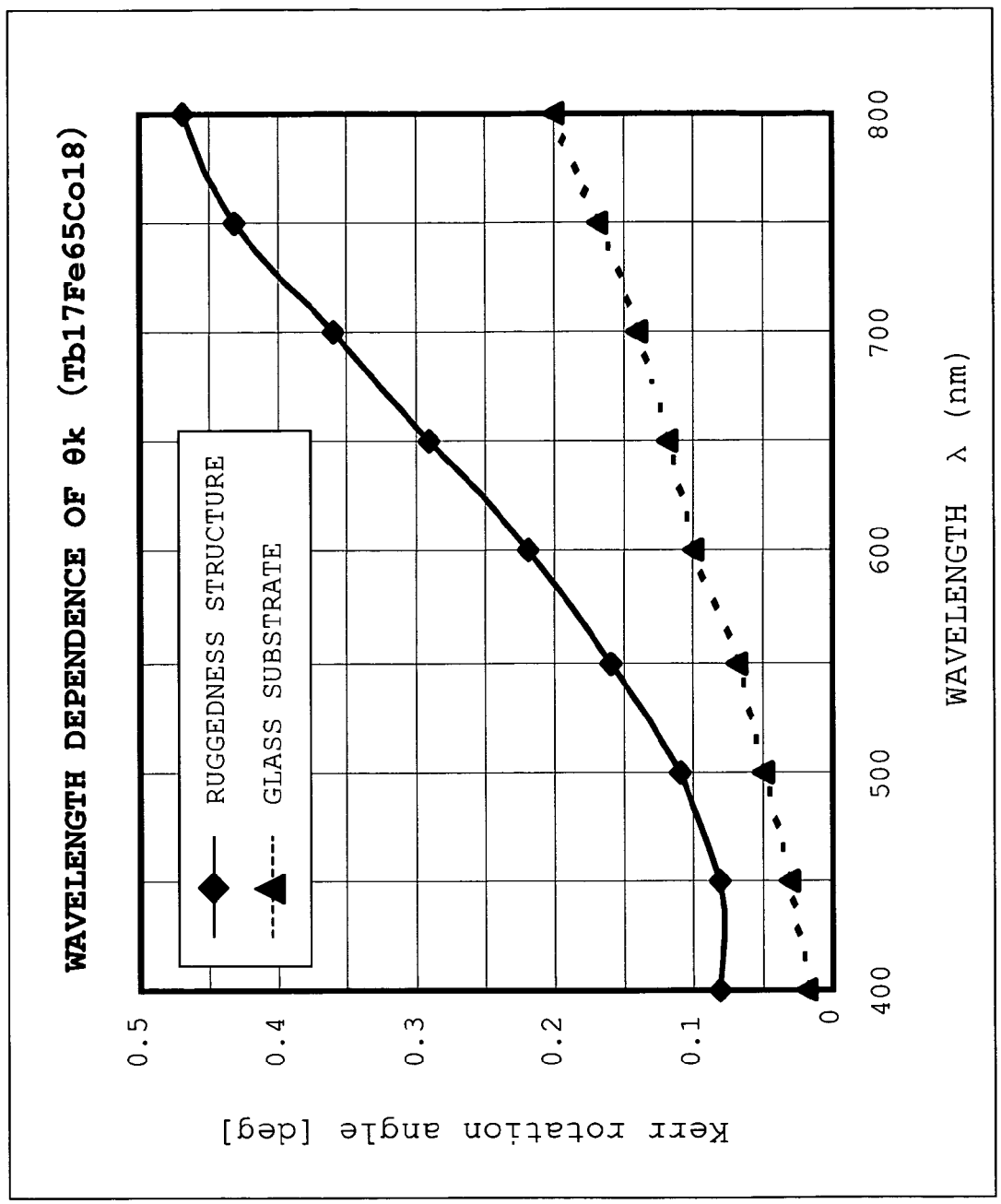
FIG. 8 shows a result of Kerr rotation angle measurement in the third measurement example (measurement of Kerr rotation angle)

Results of the measurement are shown in FIG. 8. It can be seen from FIG. 8 that in a wavelength range of 400 to 800 nm, with the substrate 10 having the ruggedness structure 10a, the Kerr rotation angle θk is uniformly increased as compared with a case of the flat glass substrate. It also can be seen that at wavelength bands (650 nm and 780 nm) of red laser light and infrared laser light used for recording and reproduction of MDs and MO discs, the increasing effect on the Kerr rotation angle θk becomes particularly conspicuous. As a result, forming the ruggedness structure 10a on the substrate 10 is expected to achieve an improvement of reproduction signal characteristics of MDs and MO discs. Also, the Kerr rotation angle θk is increased even in the vicinity of a wavelength of 400 nm, so it becomes possible to achieve the reproduction signal characteristic improvement also in a system using blue laser light.

Fourth Measurement Example

In this measurement example, like in the third measurement example, Kerr rotation angle measurement was conducted by actually performing writing. Note that in this measurement example, as compared with the case of the third measurement example, the composition ratio of the alloy film was changed to 19 at. % Tb, 61 at. % Fe, and 20 at. % Co. The other conditions were the same as those in the third measurement example. Note that also in a comparison example, the composition ratio of the alloy film was changed to 19 at. % Tb, 61 at. % Fe, and 20 at. % Co.

Figure 9:
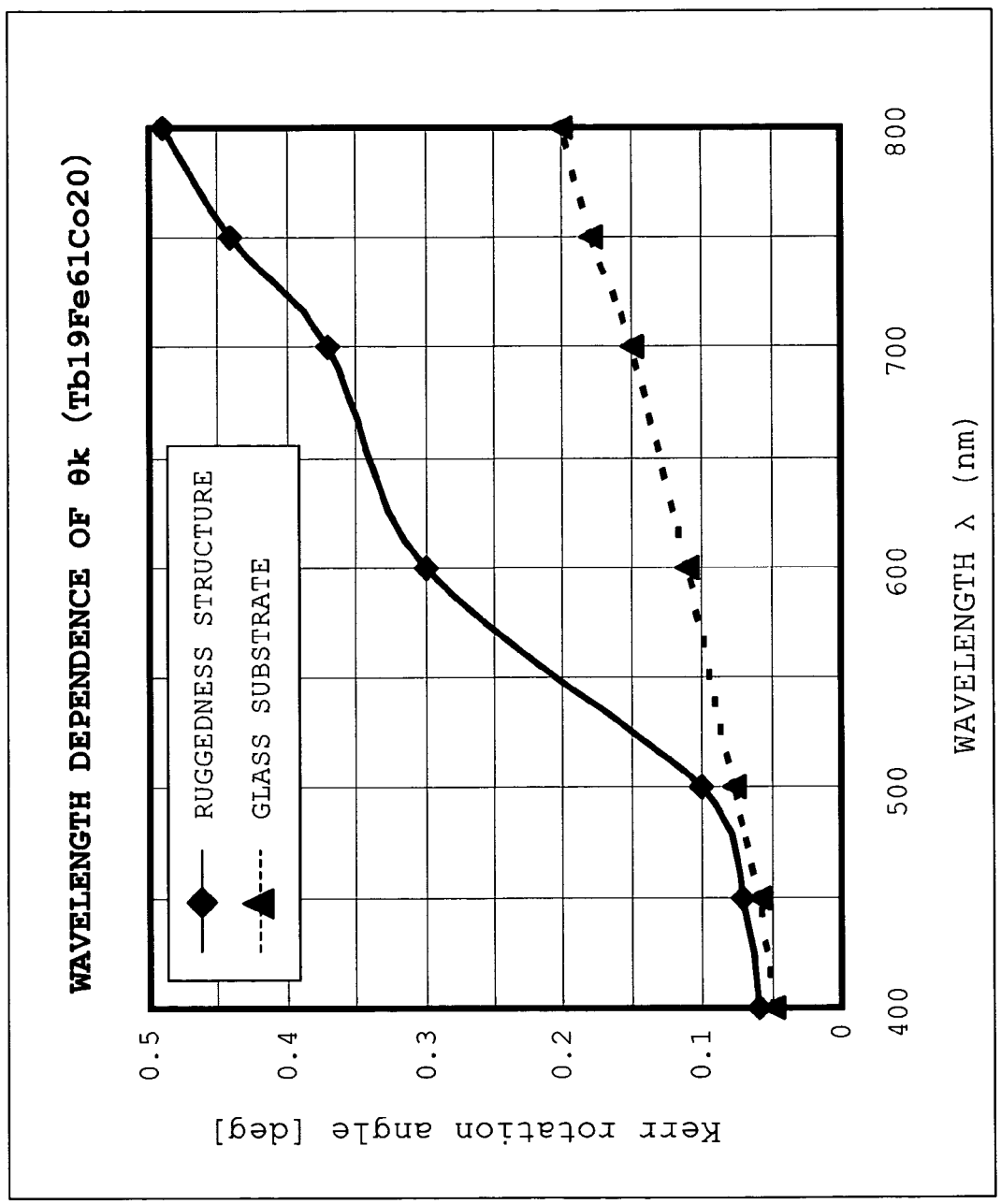
FIG. 9 shows a result of Kerr rotation angle measurement in a fourth measurement example (measurement of Kerr rotation angle)

Results of the measurement are shown in FIG. 9. It can be seen from FIG. 9 that in a wavelength range of 400 to 500 nm, with the substrate 10 having the ruggedness structure 10a, the Kerr rotation angle θk is slightly increased as compared with a case of a flat glass substrate. In this wavelength range, as compared with the case of the third measurement example, the increasing effect on the Kerr rotation angle with the ruggedness structure is considerably decreased. It also can be seen that in contrast to this, in a wavelength range of 500 to 800 nm, with the substrate 10 having the ruggedness structure 10a, the Kerr rotation angle θk is sharply increased as compared with the case of the flat glass substrate. It further can be seen that at a wavelength band (650 nm) of red laser light, the increasing effect on the Kerr rotation angle θk becomes particularly conspicuous. As a result, it is possible to expect that when an alloy film having the composition ratio described above is used, it becomes possible to achieve the increasing effect on the Kerr rotation angle with respect to the wavelength range from red laser light to infrared laser light and to particularly improve a reproduction signal characteristic with respect to the red layer light. Also, it can be understood that it is possible to change a wavelength band at which the increasing effect on the Kerr rotation angle becomes conspicuous as appropriate by changing the composition ratio of the alloy film.

(2) Verification as to Recording Density

First Measurement Example

Writing was performed with respect to a sample created under the thin film creation conditions in the third measurement example described above (verification as to the Kerr rotation angle) and a formation state of recording marks was measured using an optical microscope. After writing to a magneto-optical recording medium created in the manner described in the third measurement example described above was performed by applying a magnetic field while scanning laser light, measurement of recording marks was conducted using an optical microscope. The wavelength of the laser light used at the time of the writing was 635 nm. This laser light was converged using an object lens (with a numerical aperture of 0.55) and was made incident from a substrate side. The laser power at the time of the writing was 6 mW and the spot diameter on the magnetic layer was 1 μm. Also, the magnetic field Hex applied to the magnetic layer was 500 Oe.

The measurement of the recording marks was conducted by photographing an area containing a writing path using an optical microscope while irradiating the area with laser light that is linearly polarized light. An analyzer was arranged in front of the optical microscope and was adjusted to a position matching the Kerr rotation angle by the recording marks. Under this state, the area containing the writing path was photographed using the optical microscope. As a result of this photographing, a photographed picture was obtained in which formation areas of the recording marks in the photographed area shone in white.

Figure 10B:
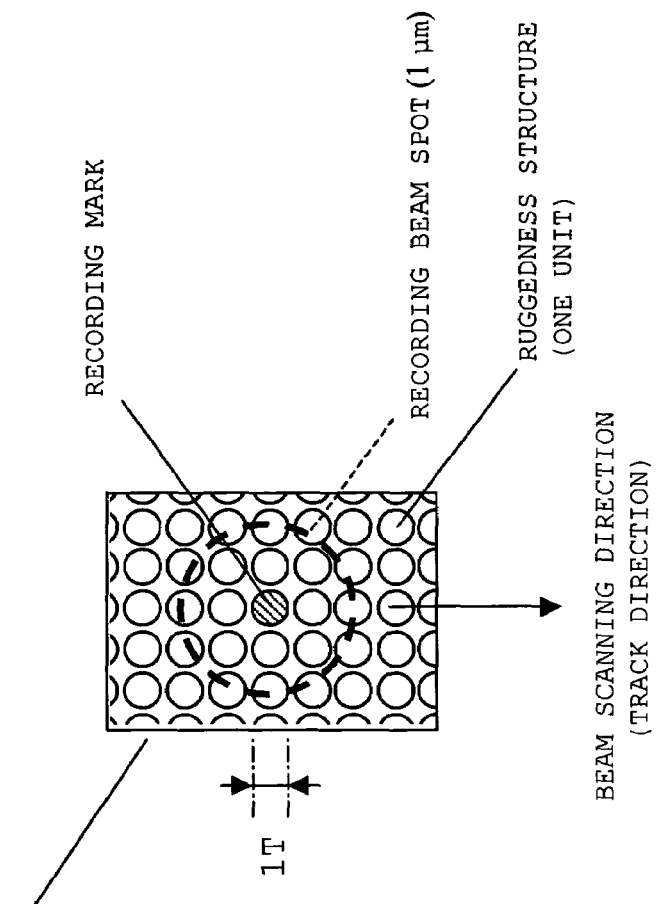
FIG. 10B is a schematic enlarged view of a part of the result of measurement in the first measurement example (measurement of recording density)
Figure 10A:
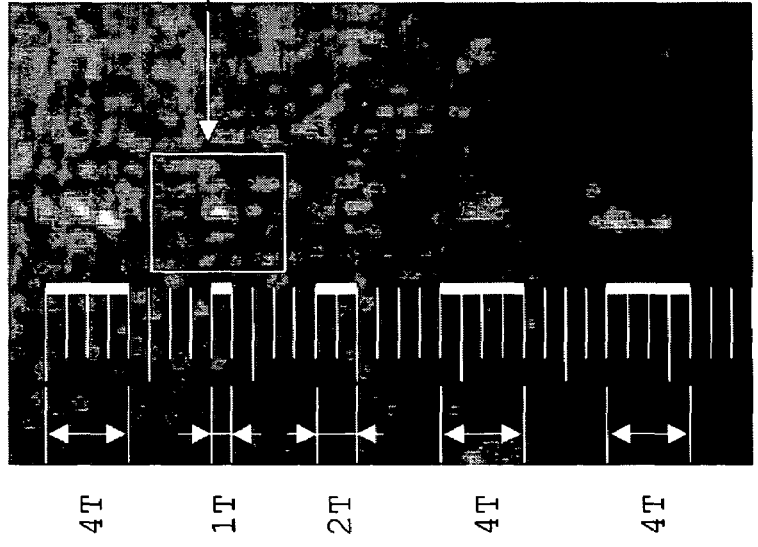
FIG. 10A shows a result of measurement of a recording mark formation state in a first measurement example (measurement of recoding density)

A result of this measurement is shown in FIGS. 10A and 10B. FIG. 10A shows a photographed picture by an optical microscope. FIG. 10B is an enlarged view (schematic diagram) of a portion of FIG. 10A surrounded by a white frame. Note that in FIGS. 10A and 10B, 1T denotes the length of one unit (250 nm) of the ruggedness structure.

It can be seen from FIGS. 10A and 10B that the recording marks were formed at the unit-length (250 nm) level of the ruggedness structure. As shown in FIG. 10B, in contrast to the fact that the beam spot of the laser light applied at the time of the writing was 1 μm, the width of each of the recording marks was around 250 nm (1T) that is around ¼ of the beam spot. When the ruggedness structure is not formed, the minimum width of the recording marks becomes around 600 nm at most. Therefore, it can be understood that when the ruggedness structure is formed, it becomes possible to considerably reduce the minimum width of the recording marks. As a result, when the ruggedness structure is formed, it becomes possible to significantly improve the recording density and achieve an increase of the capacity of the magneto-optical recording medium. Note that the minimum width of the recording marks is approximately the same as one unit length of the ruggedness structure, so it is possible to expect that it becomes possible to perform writing in the unit of the ruggedness structure when the ruggedness structure is formed. Therefore, it is expectable that when it is possible to further reduce the unit length of the ruggedness structure, it becomes possible to further increase the recording density.

Second Measurement Example

The magneto-optical recording medium used in the third measurement example described above (verification as to the Kerr rotation angle) was scanned with laser light having power (8 mW) larger than the laser power (6 mW) in the first measurement example described above and a state after the scanning was measured using an AFM.

A result of the measurement is shown in FIGS. 11A and 11B. FIG. 11A shows a photographed picture by the AFM. FIG. 11B is a schematic diagram of a portion of FIG. 11A surrounded by a white frame. It can be seen from FIGS. 11A and 11B that the ruggedness structure was collapsed with a width of the unit length (250 nm) of the ruggedness structure. It is supposed that a cause of this collapse is thermal deformation of the ruggedness structure through irradiation with the high-power laser light. It can be understood from this result of measurement that the magnetic layer was effectively heated in the ruggedness structure unit (250 nm). As a result, it is possible to expect that when the ruggedness structure is formed, it becomes possible to form the recording marks with the ruggedness structure unit width (effectively heat portions that are considerably smaller than the laser spot diameter) and achieve an improvement of the recording density.

(3) Verification as to Recording Sensitivity

Writing was performed with respect to the magneto-optical recording medium used in the third measurement example described above (verification as to the Kerr rotation angle) while changing the power of the applied magnetic field, and formation states of recording marks were verified. The verification was conducted using an optical microscope like in the first measurement example described above of the verification as to the recording density. The wavelength of laser light used at the time of the writing was 635 nm like in the example described above. This laser light was converged using an object lens (with a numerical aperture of 0.55) and was made incident from a substrate side like in the example described above. The laser power at the time of the writing was 6 mW and the spot diameter on the magnetic layer was 1 μm. The changing of the power of the applied magnetic field was achieved through changing of a distance between a magnetic head and the magneto-optical recording medium.

A result of this verification is shown in FIG. 12. As shown in FIG. 12, when the ruggedness structure is formed, it becomes possible to form recording marks even with the power of the applied magnetic field of around 300 Oe. In contrast to this, in the case of a flat substrate for which no ruggedness structure is formed, the power of the applied magnetic field of around 1,000 Oe is required in ordinary cases. Therefore, it can be understood that when the ruggedness structure is formed, it becomes possible to significantly improve the recording sensitivity with respect to the application magnetic field.

It should be noted here that as described in the second measurement example described above of the verification as to the recording density, when the ruggedness structure is formed, collapse occurs to the ruggedness structure with laser power of around 8 mW. It can be understood from this that it is possible to effectively raise the temperature of the ruggedness structure even with relatively small laser power. That is, it can be understood that when the ruggedness structure is formed, it becomes possible to improve the recording sensitivity (temperature rise efficiency) of the magnetic layer with respect to the laser light in addition to the recording sensitivity (magnetic sensitivity) with respect to the applied magnetic field.

First Embodiment

Hereinafter, a concrete construction example of a magneto-optical disc will be described.

Figure 13:
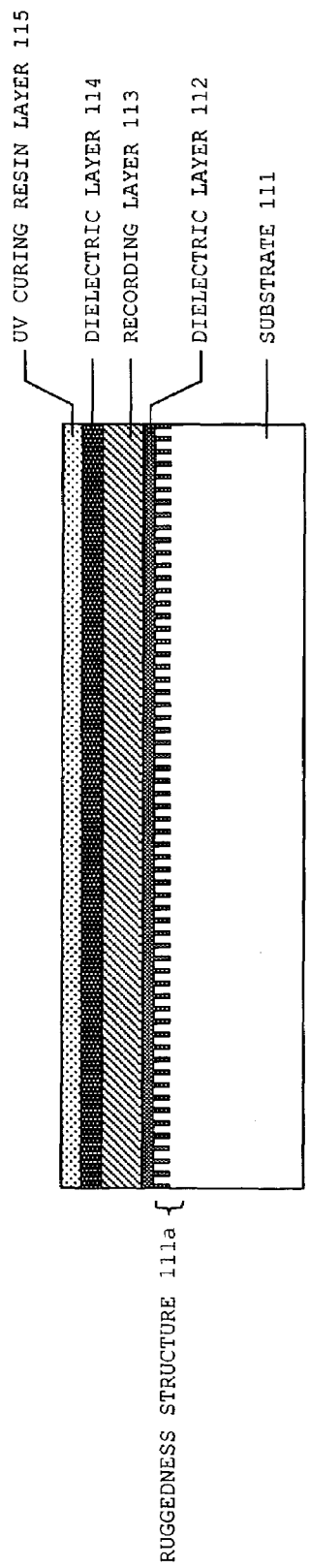
FIG. 13 shows a construction of a magneto-optical disc in a first embodiment.

In FIG. 13, a layer structure of a magneto-optical disc 100 is shown. As shown in the figure, the magneto-optical disc 100 includes a substrate 111, a dielectric layer 112, a recording layer 113, a dielectric layer 114, and an ultraviolet (UV) curing resin layer 115.

A spiral groove is formed in the substrate 111 and the ruggedness structure 111a described above is further formed for a surface of the groove. On this substrate 111, the dielectric layer 112, the recording layer 113, and the dielectric layer 114 are laminated in order with a sputtering method. Following this, in order to prevent damage, oxidation, and the like of the dielectric layer 114, the UV curing resin layer 115 is formed with a spin coating method and the like.

The dielectric layer 112 is made of a translucent material, such as AlN or SiN, and is set at a film thickness (around 5 nm to 40 nm) with which it is possible to transfer the ruggedness structure 111a to the film surface of the recording layer 113 and prevent oxidation of the recording layer 113.

The recording layer 113 is made of a rare earth transition metal, such as TbFeCo, TbDyFeCO, or TbFe, a Co-Pt lamination film, or the like and is set at a film thickness (10 nm or more, preferably, around 20 nm to 80 nm) with which it is possible for the recording layer 113 to function as a vertical magnetization film and it is possible to form the film uniformly. The recording layer 113 is a vertical magnetization film, has a compensation composition at room temperature, and assumes the Curie temperature at a recording temperature or higher.

The dielectric layer 114 is made of AlN or SiN and its film thickness is set at around 5 to 1,000 nm. Note that in order to avoid heat destruction of the ruggedness structure 111a, a radiator layer may be further formed on the dielectric layer 114. In this case, it is preferable that the dielectric layer 114 be made of a material (such as AlN) having a superior heat conduction characteristic. The UV curing resin layer 115 is formed by applying a resin to an inner peripheral portion, spreading the resin until an outer peripheral portion through rotation of the disc so that a uniform thickness of around 5 μm is obtained, and curing the resin by means of ultraviolet rays.

It should be noted here that the substrate 111 is generated through injection molding of a polycarbonate material. Here, it is possible to form the ruggedness structure 111a on the groove with a technique using material self-organization aside from the technique by electron beam etching or laser beam etching described above. Hereinafter, the technique using the material self-organization will be described.

First, a master disc of a L/G (land/groove) substrate is prepared through conventional cutting process. Here, its track pitch is around 150 nm to 600 nm. Next, a polystyrene-polymethylmethacrylate (PS-PMMA) diblock copolymer is filled into a groove. When the filled diblock copolymer is heated at around 200° C. for several ten hours, the PMMA is self-organized in the groove regularly in a dot manner with a diameter of around 40 nm and a pitch of around 80 nm. Following this, by performing oxygen plasma processing, the PMMA is selectively removed. By filling spin-on-glass (SOG) into holes generated by the removal and performing etching, a ruggedness structure corresponding to the PMMA removal portions is produced in the groove portion on the master disc. Next, by performing Ni sputtering and depositing Ni through electrolytic plating in the same manner as above, a stamper is generated. Then, by performing injection molding using the stamper, the substrate 111 to which the ruggedness structure is transferred is formed.

In this embodiment, the shape of the ruggedness structure 111a is reflected in a substrate-side surface of the recording layer 113. That is, the dielectric layer 112 existing between the recording layer 113 and the substrate 111 is set at a film thickness that is sufficiently thin for the reflection of the ruggedness structure 111a on the substrate 111 in the surface of the recording layer 113 as described above. Therefore, at the time of reproduction, laser light is multiple-reflected by the ruggedness structure reflected in the surface of the recording layer 113 and a Kerr rotation angle is superimposed from a vertical magnetization film area each time the reflection is performed. As a result, a Kerr rotation angle given to laser light owing to magnetization of the recording layer 113 is increased.

Also, in this embodiment, through the formation of the ruggedness structure, the surface area of the recording layer 113 is increased. Therefore, as described above, the heat absorption characteristic of the recording layer 113 is enhanced and it becomes easy to raise the temperature of the recording layer 113 to the Curie temperature or higher. Also, through the formation of the ruggedness structure, heat propagation in an inplane direction is suppressed, so it becomes possible to narrow a temperature rise area. As a result, according to this embodiment, it becomes possible to achieve an improvement of a recording sensitivity and a size reduction of recording marks at the same time.

Second Embodiment

This embodiment relates to a case where the present invention is applied to a magneto-optical disc of ultra-resolution type.

Figure 14:
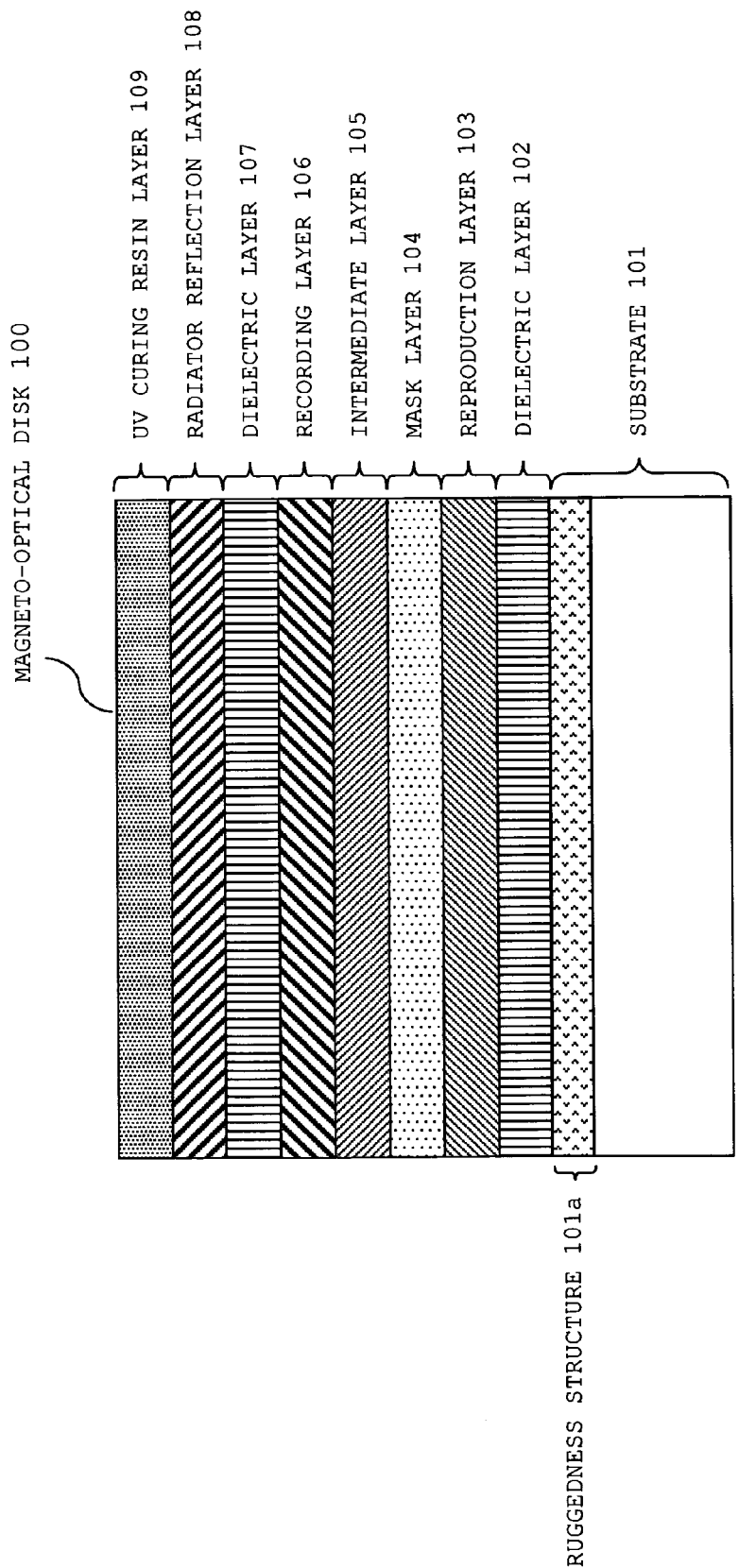
FIG. 14 shows a construction of a magneto-optical disc in a second embodiment.

In FIG. 14, a layer structure of a magneto-optical disc 100 is shown. As shown in the figure, the magneto-optical disc 100 includes a substrate 101, a dielectric layer 102, a reproduction layer 103, a mask layer 104, an intermediate layer 105, a recording layer 106, a dielectric layer 107, a radiator reflection layer 108, and an ultraviolet (UV) curing resin layer 109.

A spiral groove is formed in the substrate 101 and the ruggedness structure 101a described above is further formed for a surface of the groove. On this substrate 101, the dielectric layer 102, the reproduction layer 103, the mask layer 104, the intermediate layer 105, the recording layer 106, the dielectric layer 107, and the radiator reflection layer 108 are laminated in order with a sputtering method. Following this, in order to prevent damage, oxidation, and the like of the radiator reflection layer 108, the UV curing resin layer 109 is formed with a spin coating method and the like.

More specifically, the dielectric layer 102 is made of a translucent material, such as AlN or SiN, and its film thickness is set at 20 nm to 80 nm, typically, around 40 nm. The reproduction layer 103 is made of GdFeCo and its film thickness is set at 20 nm to 40 nm, typically, 25 nm. This reproduction layer 103 has a characteristic with which it exhibits inplane anisotropy at room temperature and becomes a vertical magnetization film at a temperature of 150° C. or higher.

The mask layer 104 is made of GdFeAl and its film thickness is set at 10 nm to 30 nm, typically, around 15 nm. This mask layer 104 is an inplane magnetization film and has a characteristic with which it loses magnetization at a temperature from 140° C. to 150° C. and assumes the Curie temperature at 150° C. or lower.

The intermediate layer 105 is made of AlN or SiN and its film thickness is 5 to 20 nm. This intermediate layer 105 is a non-magnetic layer formed for cutting off switched connection between the reproduction layer 103 or the mask layer 104 and the recording layer 106 and magnetostatically transferring signals recorded in the recording layer 106 to the reproduction layer 103 by means of leakage magnetic fields.

The recording layer 106 is made of TbFeCo and its film thickness is 35 to 100 nm, typically, 60 nm. The recording layer 106 is a vertical magnetization film, has a compensation composition at room temperature, and assumes the Curie temperature at 300° C. The dielectric layer 107 is made of AlN or SiN and its film thickness is set at 5 to 40 nm, more specifically, 10 nm. The radiator reflection layer 108 is made of Al and its film thickness is set at 10 to 30 nm, typically, around 20 nm.

The layers described above from the dielectric layer 102 to the radiator reflection layer 108 are formed with a sputtering method. Aside from this, it is possible to form the layers with a known technique such as evaporation. The UV curing resin layer is formed by applying a resin to an inner peripheral portion, spreading the resin until an outer peripheral portion through rotation of the disc so that a uniform thickness of 5 μm is obtained, and curing the resin by means of ultraviolet rays.

It should be noted here that the substrate 101 is generated through injection molding of a polycarbonate material. Here, it is possible to form the ruggedness structure 101a on the groove with the technique using the material self-organization described in the first embodiment described above aside from the technique by electron beam etching or laser beam etching.

Figure 15A:
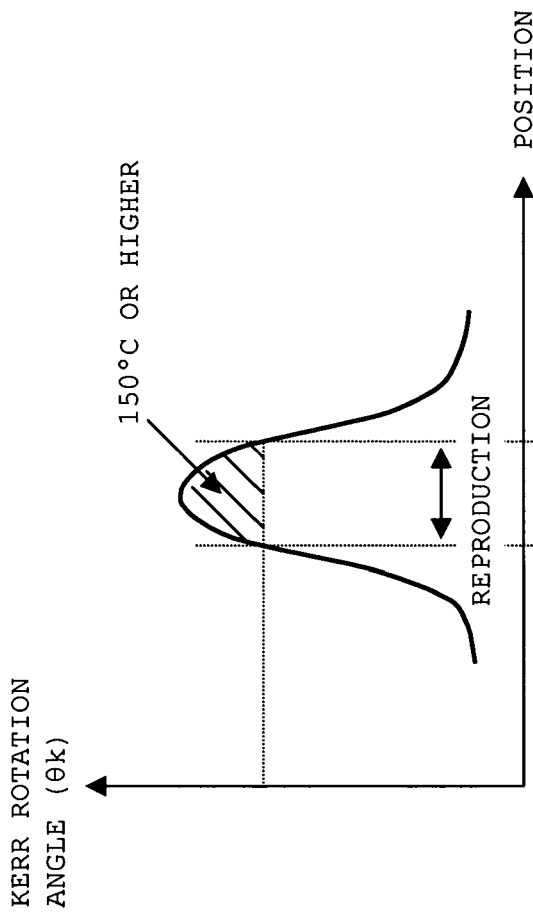
FIGS. 15A and 15B show a relation between the magneto-optical disc and a Kerr rotation angle in the second embodiment.
Figure 15B:
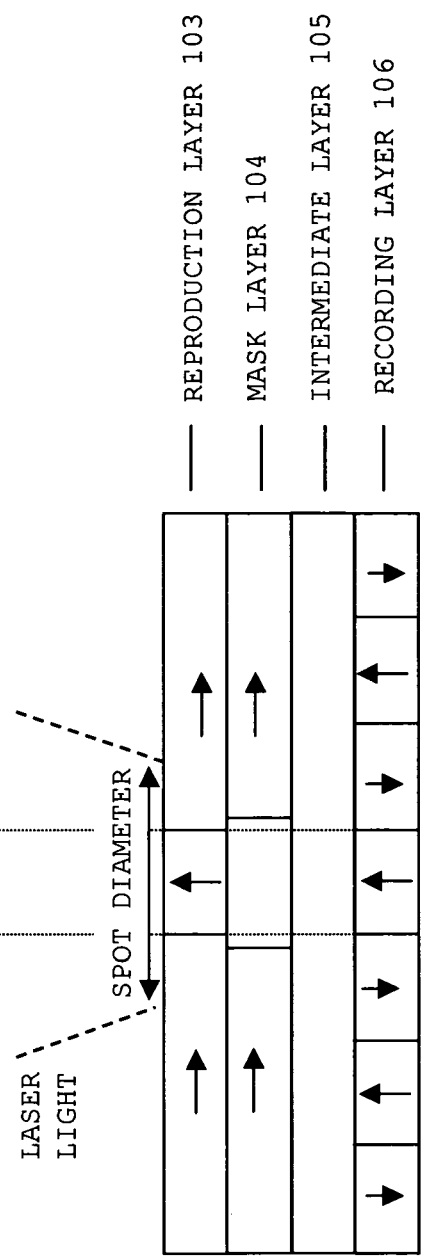

Next, a relation between the magneto-optical disc and a Kerr rotation angle due to a temperature rise is shown in FIGS. 15A and 15B.

As shown in FIG. 15B, signals are recorded in the recording layer 106. When the reproduction layer 103 is irradiated with reproduction laser light, the temperature of each layer rises. When the temperature of the mask layer 104 has reached 140° C. or higher, the mask layer 104 assumes the Curie temperature or higher and loses its magnetization. When doing so, when the temperature of the reproduction layer 103 has reached 150° C. or higher, the reproduction layer 103 becomes a vertical magnetization film from an inplane anisotropy film and magnetic domains are transferred by leakage magnetic fields from the recording layer 106.

The Kerr rotation angle of the laser light appears from an area in which the reproduction layer 103 has become the vertical magnetization film. The reproduction layer 103 is heated to 150° C. or higher in an area smaller than the spot diameter of the laser and becomes the vertical magnetization film. Therefore, the Kerr rotation angle appears in the laser light owing to the area and data in the recording layer 106 is read.

In this embodiment, the shape of the ruggedness structure 101a is reflected in the substrate-side surface of the reproduction layer 103. That is, the dielectric layer 102 existing between the reproduction layer 103 and the substrate 101 is set at a film thickness that is sufficiently thin for the reflection of the ruggedness structure 101a on the substrate 101 in the surface of the reproduction layer 103. Therefore, the reproduction laser light is multiple-reflected by the ruggedness structure reflected in the surface of the reproduction layer 103 and a Kerr rotation angle is superimposed from a vertical magnetization film area each time the reflection is performed. As a result, the Kerr rotation angle given to the laser light by the area is increased.

Also, in this embodiment, the surface area of the reproduction layer 103 is increased through the formation of the ruggedness structure. Therefore, the heat absorption characteristic of the reproduction layer 103 is enhanced and it becomes easy to raise the temperature of the reproduction layer 103 to the Curie temperature or higher. Also, through the formation of the ruggedness structure, heat propagation in an inplane direction is suppressed, so it becomes possible to narrow a temperature rise area. Therefore, this embodiment is advantageous of reproduction of minute marks. In a like manner, also at the time of recording, it becomes possible to narrow an area of the recording layer 106 that assumes the Curie temperature or higher, so it becomes possible to perform recording of minute marks.

It should be noted here that the film structure of the magneto-optical disc is not limited to the structure described above. It is sufficient for the present invention that a Kerr rotation action be utilized in reproduction and the present invention is applicable as appropriate so long as a medium is used whose recording and reproduction are performed based on heat distribution.

For instance, it is also possible to apply the present invention to a magneto-optical recording medium of type in which a so-called optical flying head (OFH) is used whose incident direction of laser light at the time of recording and incident direction of laser light at the time of reproduction are different from each other. In addition, it is also possible to apply the present invention to a magneto-optical recording medium in which an expansion reproduction layer is further arranged between a dielectric layer and a reproduction layer.

Also, in the above description, the ruggedness structure formed for the substrate is reflected in the magnetic layer. The substrate surface may be set flat and the ruggedness structure may be formed directly for the magnetic layer surface at the time of film formation.

It should be noted here that when the magnetic layer is thin (1,000 Å or less, for instance), it is possible to expect the same effect as that described above even when laser light is made incident onto the magnetic layer from a film-surface side on which the ruggedness structure is not formed.

Further, the ruggedness structure is not limited to any one of the structures shown in FIGS. 2A and 2B, FIGS. 4A and 4B, and FIGS. 5A and 5B described above and may be changed to another shape, such as a cross-sectional saw shape, so long as it is possible to cause multiple-reflection to laser light. In the embodiments described above, polycarbonate is used as the substrate material. A biodegradable resin produced from polylactic acid may be used instead.

It is possible to make various changes to the embodiments of the present invention as appropriate without departing from the scope of the technical idea described in the appended claims.

What is claimed is:

1. A magneto-optical recording medium to which recording and reproduction are performed using a laser light and an external magnetic field, comprising:
    a substrate; and
    a magnetic layer disposed on the substrate, wherein
    the magnetic layer comprises a plurality of columnar projections arranged evenly on a film surface of the magnetic layer with a pitch, smaller than a wavelength of the laser light, in both a lengthwise direction and a crosswise direction.

2. A magneto-optical recording medium according to claim 1,
    wherein the columnar projections on the magnetic layer are formed through transferring a shape of columnar projections formed on the substrate to the film surface of the magnetic layer.

3. A magneto-optical recording medium according to claim 2,
    wherein the columnar projections formed on the substrate are obtained by forming a plurality of columnar projections on a surface of the substrate with a predetermined pitch.

4. A magneto-optical recording medium according to claim 1,
    wherein the pitch in the lengthwise direction is equal to the pitch in the crosswise direction.

5. A magneto-optical recording medium according to claim 1,
    wherein the columnar projections are cylindrical.

* * * * *